United States Patent [19]
Kirshenbaum et al.

[11] Patent Number: 6,142,684
[45] Date of Patent: *Nov. 7, 2000

[54] JOINING A PLURALITY OF TYPE HIERARCHIES IN AN OBJECT ORIENTED PROGRAMMING LANGUAGE WITHOUT INHERITING FROM A BASE CLASS AND WITHOUT MODIFICATION TO THE TYPE HIEARCHIES

[75] Inventors: Evan R. Kirshenbaum, Mountain View; Keith E. Moore, Santa Clara, both of Calif.

[73] Assignee: Hewlett-Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/826,540

[22] Filed: Apr. 3, 1997

[51] Int. Cl.$^7$ ........................................................ G06F 9/44
[52] U.S. Cl. .............................................. 395/708; 395/707
[58] Field of Search ..................................... 395/703, 708, 395/707

[56] References Cited

PUBLICATIONS

James Rumbaugh et al. Object Oriented Modeling and Design pp. 1–3,8,23,27–46,6–=62,84–85,243,299, Nov. 1990.

Bjarne Stroustrup et al., The Annotated C++ Reference Manual, pp. 37,58–59,111,113,195–207,217–221,280,282, 285,295–299,307–327,329, 1990.

Bjarne Stroustrup, The Design and Evolution of C++, pp. 22,58–60,238241,301–304,365–373, Mar. 1994.

Jim Holmes, Object Oriented Compiler Construction, pp. 133–182, 417, Nov. 1994.

Type Systems for Querying Class Hierarchies with Non–strict Inheritence Alexander Borgida, 1989.

The ObjectStore database system Charles Lamb et al, Oct. 1991.

The Design and Evolution of C++ B. Stroustrup—Whole book, Mar. 1994.

The Annotated C++ Reference manual pp. 163–237, 341–351 and 417 (reprinted version), Jan. 1994.

Object–Oriented Information Systems David Taylor, Apr. 1992.

Type–safe Linkage for C++, Stroustrup USENIX Proceedings C++ Conference Denver Co., Oct. 1988.

Mixin–based Inheritance G. Bracha et al ACM OOPSLA, 1990.

Reusablity Through Fine Grain Inheritance Johnson et al. GEC–Marconi Ltd, Jun. 1991.

Object Oriented Program Slicing, L. Roberta UMI Dissertation Services, Apr. 1994.

M.A. Ellis & B. Stroustrup, "The Annotated C++Reference Manual", pp. 307–340, 1990.

S. Meyers, More "Effective C++," pp. 159–182, 1996.

S. Meyers, More "Effective C++," pp. 181–182, 1996.

*Primary Examiner*—Tariq R. Hafiz
*Assistant Examiner*—Todd Ingberg

[57] ABSTRACT

A system and method using a computer for joining a plurality of hierarchies of types is described. Each type in each type hierarchy includes a template for objects. At least one reference class is defined as computer-readable instructions stored in a memory of a computer for defining a class and includes a discriminator which can refer to instances of at least one such type within one of the type hierarchies and including, for each type hierarchy, an initialization function which takes as an argument a reference to an instance of any of the types in the type hierarchy. The initialization function included for each type hierarchy is performed by loading the discriminator with the argument of the initialization function.

31 Claims, 3 Drawing Sheets

JOINING A PLURALITY OF TYPE HIERARCHIES IN AN OBJECT ORIENTED PROGRAMMING LANGUAGE WITHOUT INHERITING FROM A BASE CLASS AND WITHOUT MODIFICATION TO THE TYPE HIEARCHIES

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

This invention relates generally to object oriented programming languages and more particularly to a system and method for joining a plurality of type hierarchies in an object oriented programming language.

Object oriented programming languages, such as C++, Objective C, Java, SmallTalk, Object Pascal and others, have become the tools of choice in modern software engineering practice. These languages enable programmers to define classes of objects which can be more readily adapted to specific software applications than previously possible with control flow programming languages. And object class libraries result in better structured code and lower development costs.

Often, to achieve code minimization, clarity and maintainability, object class functions must be written to transparently operate over a variety of concrete data types. In C++, for instance, if two data types (or classes) are related by inheritance, a function can be written to receive a reference to an instance of the derived class as a reference to the common base class. Operations on the base class, though, can be overridden in the derived class so the reference appears to be polymorphic. For polymorphic functions, the behavior of the invoked method becomes dependent upon the data type of the referenced object, including whether the referenced object is considered to be constant, and not on the data type of the static reference.

In addition, many languages allow const'ness overloading whereby functions can be declared as being applicable to constant or nonconstant instances. Const'ness overloading is an attractive feature for ensuring proper function referencing, such as ensuring that a function which modifies an object is not called on an object which should not be modified. However, often the underlying language does not support compiler maintenance of const'ness overloading, such as in the Java programming language.

In many object oriented programming languages, including C++, related problems exist with supporting polymorphic functions which must operate over primitive data types which, not being considered instances of classes, cannot have a common base class or instances of classes within type hierarchies not unified by a common base class. The latter case is particularly problematic when the class declarations cannot be modified. These problems often occur with class libraries from third parties, such as external vendors.

One prior art solution uses function overloading, such as described in M. A. Ellis & B. Stroustrup, "The Annotated C++ Reference Manual," pp. 307–340, 1990, the disclosure of which is incorporated herein by reference. However, this solution suffers from several drawbacks. First, function overloading requires a separate function implementation for each supported primitive type, thereby leading to code duplication and increased code maintenance. Also, function return types cannot be overloaded in many languages, such as C++, and therefore a result must be implemented as an additional parameter on the function call with an adverse effect on the "naturalness" of the code.

Another prior art solution uses templated functions, member functions and classes, such as described in S. Meyers, "Effective C++," pp. 184–191, 1992, the disclosure of which is incorporated herein by reference. This solution also suffers from several drawbacks. First, templated member functions are not currently supported by most C++ compilers which therefore limits their applicability. Second, this solution improves code maintenance at the expense of code exposure, as most compilers require the implementation of each templated class or function to be visible to the client that uses it. Third, the template must generally be specialized for "primitive" classes, such as described in S. Meyers, "More Effective C++," pp. 159–182, 1996, the disclosure of which is incorporated herein by reference. Moreover, if there are N parameters for each specialization which can each take on K possible data types, N×K specializations must be written or implicitly generated. Fourth, the caller function must statically determine the types of the arguments.

A further prior art solution uses "smart pointer classes" for overloading member functions based on const and non-const arguments, also referred to as "const 'ness," such as described in S. Meyers, "More Effective C++," pp. 181–182, 1996. This solution defines two pointer classes: (1) a pointer-to-const-T class; and (2) a pointer-to-non-const-T class derived from the pointer-to-const-T class. However, this solution is directed to the issue of reference counted pointers and not merging type hierarchies or specializations based on data type primitives. Moreover, this solution fails if the type of an outbound argument is determined as part of the operation of the function, such as determining whether an integer argument is long or double.

Yet a further prior art solution uses a tagged union of pointers for arguments supporting multiple data types. This solution requires the use of both a union discriminator for indicating the data type of the referenced argument and the data value of the union itself. Both items must be passed or returned. A problem with this solution is the effect on the naturalness of the code. Instead of directly calling a function, the union must be created and assigned. Moreover, if a function caller receives a union as the output parameter, to use the result, the function caller must determine the data type contained in the received union, typically through the use of a lengthy switch or comparison statement followed by an accessor method on the union.

Therefore, there is a need for a system and method for joining a plurality of type hierarchies in an object oriented programming language, particularly when the inheritance tree cannot be modified, such as when a third party class library is used.

There is a further need for a system and method for performing const'ness checking in programming languages which do not directly support const'ness checking.

There is still a further need for a system and method which allows a reference class to be inserted in front of pre-existing type hierarchies, including C++ primitive data types.

SUMMARY OF THE INVENTION

An embodiment of the present invention is a system and method using a computer for joining a plurality of hierarchies of types. Each type in each type hierarchy includes a template for objects. At least one reference class is defined as computer-readable instructions stored in a memory of the computer for defining a class and includes a discriminator which can refer to instances of at least one such type within one of the type hierarchies and including, for each type hierarchy, an initialization function which takes as an argument a reference to an instance of any of the types in the type hierarchy. The initialization function included for each type hierarchy is performed by loading the discriminator with the argument of the initialization function.

The foregoing and other objects, features and advantages of the invention will become more readily apparent from the following detailed description of a preferred embodiment of the invention which proceeds with reference to the accompanying drawings.

The APPENDIX is a listing of example segments of C++ code illustrating the subject matter of the present invention, including:

EXAMPLE 1 illustrating prior art referencing of invoked methods declared as constant and non-constant functions;

EXAMPLE 2 illustrating a prior art approach for a class implementing a reference to a class hierarchy;

EXAMPLE 3 illustrating a prior art approach to performing const'ness checking at compile time, rather than deferring const'ness checking until runtime;

EXAMPLE 4 illustrating a class which will be joined with another separate class;

EXAMPLE 5 illustrating a reference class for type hierarchies according to the present invention;

EXAMPLE 6 illustrating a reference class providing the illusion of a fictitious base class joining type hierarchies according to the present invention;

EXAMPLE 7 illustrating a reference class providing the illusion of a fictitious base class joining type hierarchies which include built-in data types according to the present invention; and EXAMPLE 8 illustrating the use of reference classes for polymorphism when joining type hierarchies which include built-in data types.

DETAILED DESCRIPTION

Figure 1:
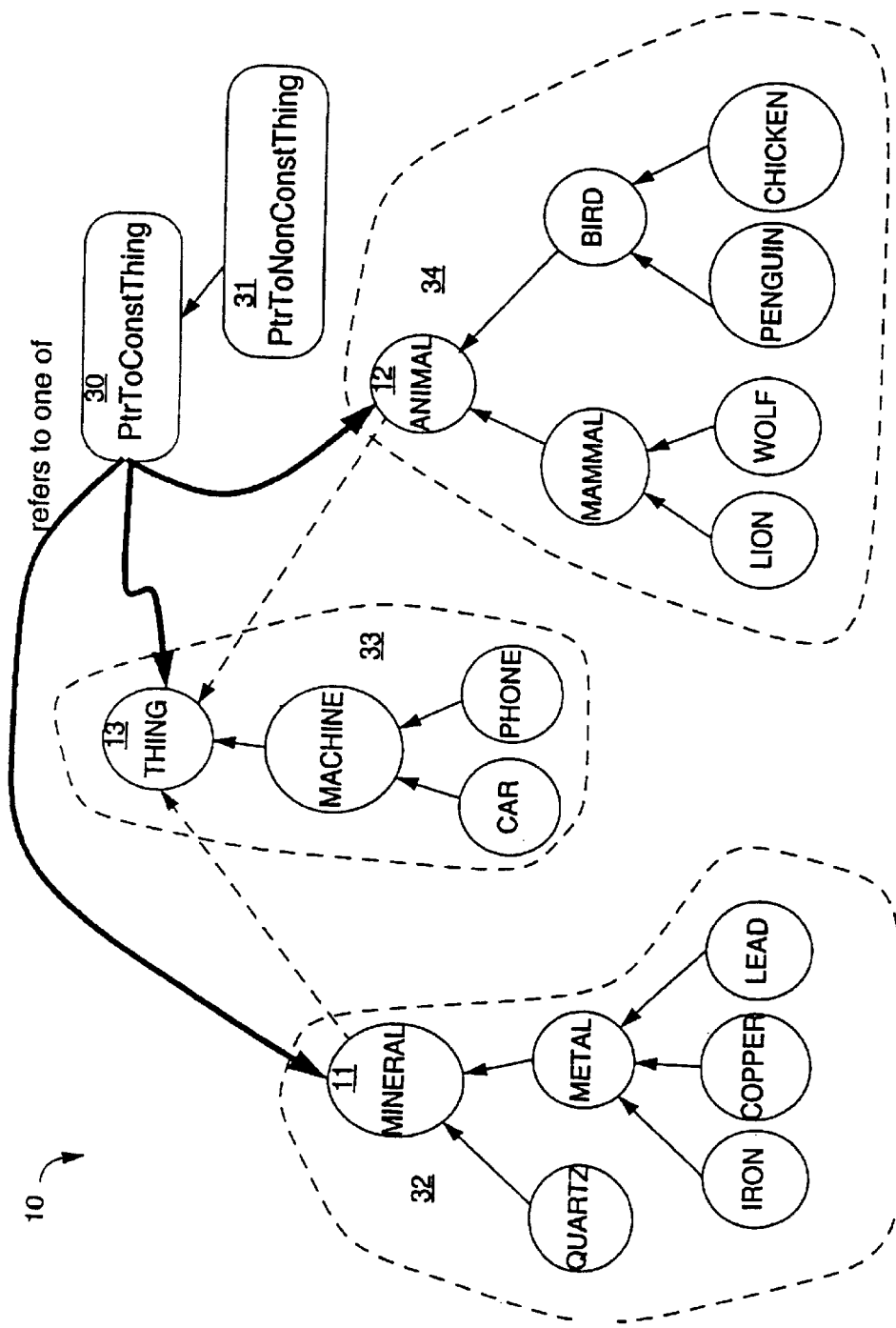
FIG. 1 shows, by way of example, a class diagram 10 of type hierarchies joined by a common base class according to the present invention.

FIG. 1 shows, by way of example, a class diagram 10 of type hierarchies joined by a common base class according to the present invention. The type hierarchies preferably have no immediate common parent, although they might be related by a common ancestor or may be disjoint. The present invention is implemented as computer-readable instructions in C++ and stored in the memory of a computer 16 (shown in FIG. 2). Therefore, it is discussed using C++ terminology, although the subject matter and underlying concepts apply equally to other, particularly object oriented, programming languages. Two classes Mineral 11 and Animal 12 are defined as the roots of separate, unrelated class hierarchies 32 and 34, respectively. Both of the classes Mineral 11 and Animal 12 are "joined" to the class hierarchy 33 whose common base class is class Thing 13 using a reference class according to the present invention, as further described below with reference to EXAMPLE 3 et seq. A class is a user-defined data type which consists of a template for sequence of objects referred to by each instance of the type, a set of functions for manipulating the objects and a set of restrictions on access to the objects and functions (not shown). In turn, each object consists of either built-in or user-defined data types. Classes and overloading are described in M. A. Ellis & B. Stroustrup, "The Annotated C++ Reference Manual," pp. 163–193 and 305–339, 1990, the disclosure of which is incorporated herein by reference.

Figure 2:
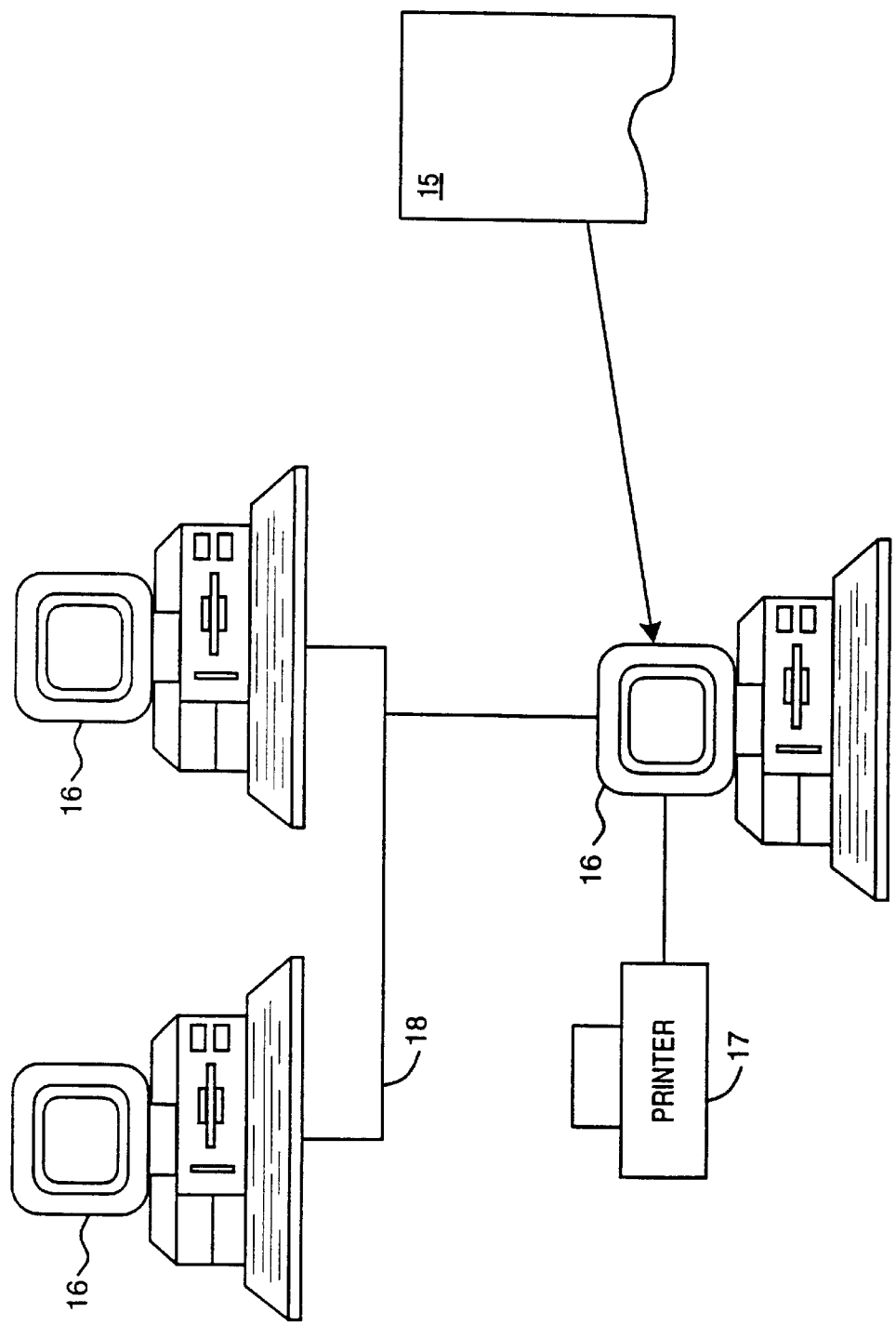
FIG. 2 is a block diagram of a system for joining type hierarchies according to the present invention.

FIG. 2 is a block diagram of a system for joining type hierarchies according to the present invention. The computer 16 is a conventional computer, including a processor, memory (both volatile and non-volatile) and input/output facilities, including a display, keyboard and printer 17 and providing programming language translation facilities for converting a computer program 15 written in source code into object code executable by the processor. Suitable language translation facilities include compilers, interpreters, virtual machines and the like. In addition, the computer 16 can be interconnected with other computers 16 over a network 18. An example of a computer 16 is a Vectra personal computer manufactured by Hewlett Packard Company, Palo Alto, Calif., although virtually any computer would be suitable provided it can support a programming language within the spirit of the present invention. A computer program 15, including the program code instructions for the type hierarchies, can be stored in the memory of the computer or on any other computer-readable storage medium for encoding the program code.

EXAMPLE 1 (shown in the APPENDIX) is a segment of prior art C++ code illustrating referencing of invoked methods declared as constant ("const") and non-constant ("nonconst") functions. Class Thing 13 (shown in FIG. 1) is defined (lines 1–7) with three virtual functions, f(), g() and x(). Function f() is declared const (line 3). Function g() is declared const (line 4) and overloaded nonconst (line 5). Function x() is declared nonconst (line 6). A nonconst instance nonconst_a (line 9) and const instance const_a (line 10) are defined.

In C++, it is important for invoked method instances, including initialization and function call statements, to preserve proper const'ness behavior and semantics. Here, class Thing 13, as the reference class, determines when it is permissible for class instances to be initialized or called as const or nonconst objects. Thus, const references Thing&tr1 (line 12) and Thing&tr2 (line 13) initialized to nonconst object nonconst_a and const object const_a, respectively, are valid. Similarly, nonconst reference Thing&tr3 (line 14) initialized to nonconst object nonconst_a is valid. However, nonconst reference Thing&tr4 (line 16) initialized to const object const_a is invalid. Since Thing&tr4 violates the guarantee of const'ness, the attempted assignment is invalid and results in a compiler error.

Similarly, class Thing 13 also determines when it is permissible for the encapsulated methods, f(), g() and x(), to be called as nonconst and const functions. Thus, nonconst function calls nonconst_a.f(), nonconst_a.g() and nonconst_a.x() (lines 19, 20 and 22, respectively) are valid. Note function call nonconst_a.g() invokes the second, overloaded nonconst function g() (line 5). Similarly, const function calls const_a.f() and const_a.g() (lines 23 and 24, respectively) are valid. Note function call const_a.g()

invokes the first overloaded function g(). However, const function call const_a.x() is invalid and results in a compiler error. Function x() is declared in reference class Thing 13 as a nonconst function which cannot be called with a const reference and function x() should only be allowed to be invoked if the reference is to a nonconst object. Since const_a.x() violates the guarantee of const'ness, the attempted function call is invalid and results in a compiler error. The use of such functions must be restricted to operations appropriate to constant and nonconstant objects as described above and in M. A. Ellis & B. Stroustrup, "The Annotated C++ Reference Manual," pp. 108–112, 1990, the disclosure of which is incorporated herein by reference.

EXAMPLE 2 (shown in the APPENDIX) is a segment of prior art C++ code illustrating a class implementing a reference to a class hierarchy. This example builds on the previous example. A pointer class RefThing (lines 1–23) defines a const pointer ptr (line 4) for an instance of class Thing 13. Functions f(), g() and x() are defined as const functions (lines 7–9, respectively) since each function, when invoked, stores a constant function pointer, regardless of the const'ness of the referenced object itself. A boolean pointer const_p is defined (line 11) for indicating the const'ness of the invoked method at runtime. A pair of nonconst and const constructors (lines 13–17 and 19–24, respectively) are defined. These constructors each load a pointer to an object instance of class Thing 13 (lines 15 and 21, respectively) and set the const_p flag to indicate const'ness (lines 16 and 22, respectively), false if nonconst and true if const.

Since each instance of class RefThing points to an instance of class Thing, the same const'ness restrictions on functions f(), g(), and x() defined for class Thing 13 (lines 3–6 in EXAMPLE 1), including overloading of function g(), apply. Thus, an instance of function g() is defined (lines 26–34). When invoked, the definition of function g() of class RefThing (line 8) is used for a const instance while the inherited definition of function g() of class Thing 13 is used for a nonconst instance (lines 31–32). The boolean flag const_p is used as a selector between the const and nonconst instances (line 28).

The implementation of function x() is also defined (lines 36–44). When invoked, the function x() of class Thing 13 (lines 41–42) is used if the instance of RefThing was constructed with a non-const instance (or derived non-const instance) of class Thing 13. Since it is an error to call function x() on a const instance of class Thing 13, an error condition is thrown (line 39) if the instance of class RefThing was constructed with an instance of class Thing 13. The boolean flag const_p indicates whether the initial instance was constant or not (line 38).

The prior art C++ code of EXAMPLE 2 illustrates const'ness checking performed at runtime. The boolean flag const_p determines whether a valid instance is being called with respect to const'ness, but at the expense of a performance penalty. Moreover, this solution must still rely on runtime catching of the error, and cannot catch errors at compile time. Therefore, it would be desirable to enable overloaded method instances to be called with the proper const'ness semantics detected at compile time, thereby avoiding a performance penalty at runtime.

EXAMPLE 3 (shown in the APPENDIX) is a segment of prior art C++ code illustrating an approach to performing const'ness checking at compile time, rather than deferring const'ness checking until runtime. This example builds on the previous examples. A pair of pointer classes are structured wherein const functions and nonconst functions are defined in separate classes, therefore enabling const'ness checking through class inheritance. A pointer class PtrToConstThing 30 is defined (lines 1–14) for referring to functions f() and g() defined as const functions in class Thing 13 (lines 3–4 in EXAMPLE 1). A derived pointer class PtrToNonConstThing 31 is defined (lines 16–22) for referring to functions g() and x() defined as nonconst functions in class Thing 13 (lines 4–6 in EXAMPLE 1). A const pointer ptr in class PtrToConstThing 30 (line 7) refers to an instance of class Thing.

Three object instances of classes RefThing (tr), PtrToNonConstThing 31 (nonconst_c) and PtrToConstThing 30 (const_c) are defined (lines 24–26, respectively) for illustrating the differences between compile time versus runtime const'ness checking for function calls. Thus, the validity of the const'ness for an instance of method x() referring to class RefThing (line 28) can only be determined at runtime. Conversely, the validity of the const'ness for instances of the method x() referring to classes PtrToConstThing 30 and PtrToNonConstThing 31 (lines 29–21) can be determined at compile time since method x() is not defined in class PtrToConstThing 30.

Similarly, two assignment statements are defined (lines 33–35, respectively) for illustrating the differences between compile time versus runtime const'ness checking for assignments. Thus, an assignment of nonconst reference nonconst_c to const reference const_c (line 33) is valid. Conversely, an assignment of const reference const_c to nonconst reference nonconst_c (line 34) is invalid and results in a compiler error. This attempted assignment improperly relaxes the restrictions guaranteed to a const object, analogous to the fourth initialization example for Thing&tr4 presented in EXAMPLE 1 (lines 16–17 in EXAMPLE 1).

Finally, functions g() are defined for object instances of classes PtrToConstThing 30 and PtrToNonConstThing 31 (lines 37–40 and 42–46, respectively). The first function g() of class PtrToConstThing 30 (lines 37–40) refers to the const function g() of class Thing 13 (line 4 in EXAMPLE 1). The second function g() of class PtrToNonConstThing 31 (lines 42–46) refers to the nonconst function g() of class Thing 13 (line 5 in EXAMPLE 1). The use of two function definitions for const and nonconst object instances of method g() avoids the use of a boolean flag, such as boolean flag const_p in EXAMPLE 2, which only provides runtime const'ness checking. In the present example, inheritance is used to guarantee proper const'ness behavior using normal class referencing semantics. This approach avoids the runtime performance penalty of EXAMPLE 2 while maintaining the naturalness of the resultant code. It does not, allow classes PtrToConstThing 30 and PtrToNonConstThing 31 to refer to instances of types which do not derive from class Thing 13.

EXAMPLE 4 (shown in the APPENDIX) is a segment of C++ code illustrating a class Mineral 11 which will be joined with the separate class Thing 13. Class Mineral 11 forms the root of a separate class hierarchy 32 from class Thing 13. Class Mineral 11 does not define a function x(), but does define the same functions f() and g() as defined in class Thing 13 (lines 3–5 of EXAMPLE 1). Also, a new function z() with a different type signature is defined. As will be seen with reference to EXAMPLE 6, the functionality of the function x() of class Thing 13 (line 6 of EXAMPLE 1) can be mapped to the present function z() of class Mineral 11 (line 5).

EXAMPLE 5 (shown in the APPENDIX) is a segment of C++ code illustrating a reference class for type hierarchies according to the present invention. This example builds on the previous examples to "join" the class hierarchies for the classes Thing 13 and Mineral 11. The classes PtrToConstThing 30 and PtrToNonConstThing 31 (lines 1–16 and 18–41, respectively), defined above in EXAMPLE 3, are modified as follows. First, constructors for const and nonconst instances of class Mineral 11 are defined for the classes Thing 13 and Mineral 11 (lines 6–7 and 23–24, respectively). Second, the class PtrToConstThing 30 is augmented with a discriminator for selecting at runtime the appropriate const or nonconst instance of the referred object. The discriminator consists of state (enumerated type) and pointer (pointer union) components. The state component is an enumerated type my_ptr_type (line 10) for indicating whether the referenced object is an instance of class Thing 13 or class Mineral 11. The pointer component ptr is a union of object pointers for storing a pointer to an instance of class Thing 13 or class Mineral 11. The constructors for both classes PtrToConstThing 30 and PtrToNonConstThing 31 (lines 6–7 and lines 23–24, respectively) set the state and load the pointer value for these two components by selecting the appropriate enumerated state my_ptr_type and loading the class pointer into the union ptr. The pointer component can also be implemented using pointer structures other than the union of pointers shown here. For instance, in an alternative embodiment (not shown), a generic pointer, such as a void * in C++, is employed.

In the present example, instances of functions f() and x() are defined. Function f() (lines 27–41) illustrates the normal case of joining two type hierarchies so an instance of class Mineral 11 (shown in EXAMPLE 4) appears to derive from class Thing 13 (EXAMPLE 1). Function f() is defined as a const function in class PtrToConstThing 30 (line 3). Note function f() is declared in the present class PtrToConstThing 30 (line 3) as well as in classes Thing 13 (line 6 in EXAMPLE 1) and Mineral 11 (line 3 in EXAMPLE 4). The structure of this function f() is used for determining the appropriate class hierarchy to which the discriminator refers and the pointer loaded into the union ptr (lines 11–14) ensures that the function call to f() is valid. A switch statement (lines 31–40) using the state variable my_ptr_type discriminates between the class methods f() for classes Thing 13 and Mineral 11 (lines 32–34 and 37–38, respectively). Using the stored pointer in the union ptr, the appropriate function f() with respect to const'ness is invoked (lines 33 and 37).

Function x() (lines 43–57) illustrates the often-encountered case of mapping an invoked method not having the same signature into an existing class hierarchy. The functionality of function x() of class Thing 13 is provided by invoking function z() of class Mineral 11. The semantics of function Mineral::z() act like function Thing::x(). Function x() is defined as a const function in class PtrToNonConstThing 31 (line 21). Unlike function f(), class Mineral 11 (EXAMPLE 4) does not define a function x(). Therefore, adaptation or mapping is required to enable an instance of function x() of class PtrToNonConstThing 31 to function as if class Mineral 11 was derived from class Thing 13.

The present approach effectively enables class Thing 13 to act as a common base class to class Mineral 11 without modification to the definitions in class Mineral 11. The structure of this function x() is used for determining the appropriate function x() or z() depending on the particular class instance invoked. A switch statement (lines 45–56) using the state variable my_ptr_type discriminates between the functions x() for class Thing 13 and z() for Mineral 11 (lines 46–49 and 51–55, respectively). Using the stored pointer in the union ptr, the appropriate function x() or z() is invoked (lines 46 and 51). Thus, even though there is no definition of function x() in class Mineral 11, the function x() of class PtrToNonConstThing 31 (lines 52–54) is mapped to the function z() of class Mineral 11 with the appropriate arguments for function z() provided, thereby preserving the appropriate semantics for function x().

As shown in the previous example, the present invention allows an instance of class Mineral 11 to be treated as if it was derived from class Thing 13. While inheritance is not used to achieve this result, the resulting functions appear to inherit the same behaviors and maintain the appropriate const'ness restrictions.

Figure 3:
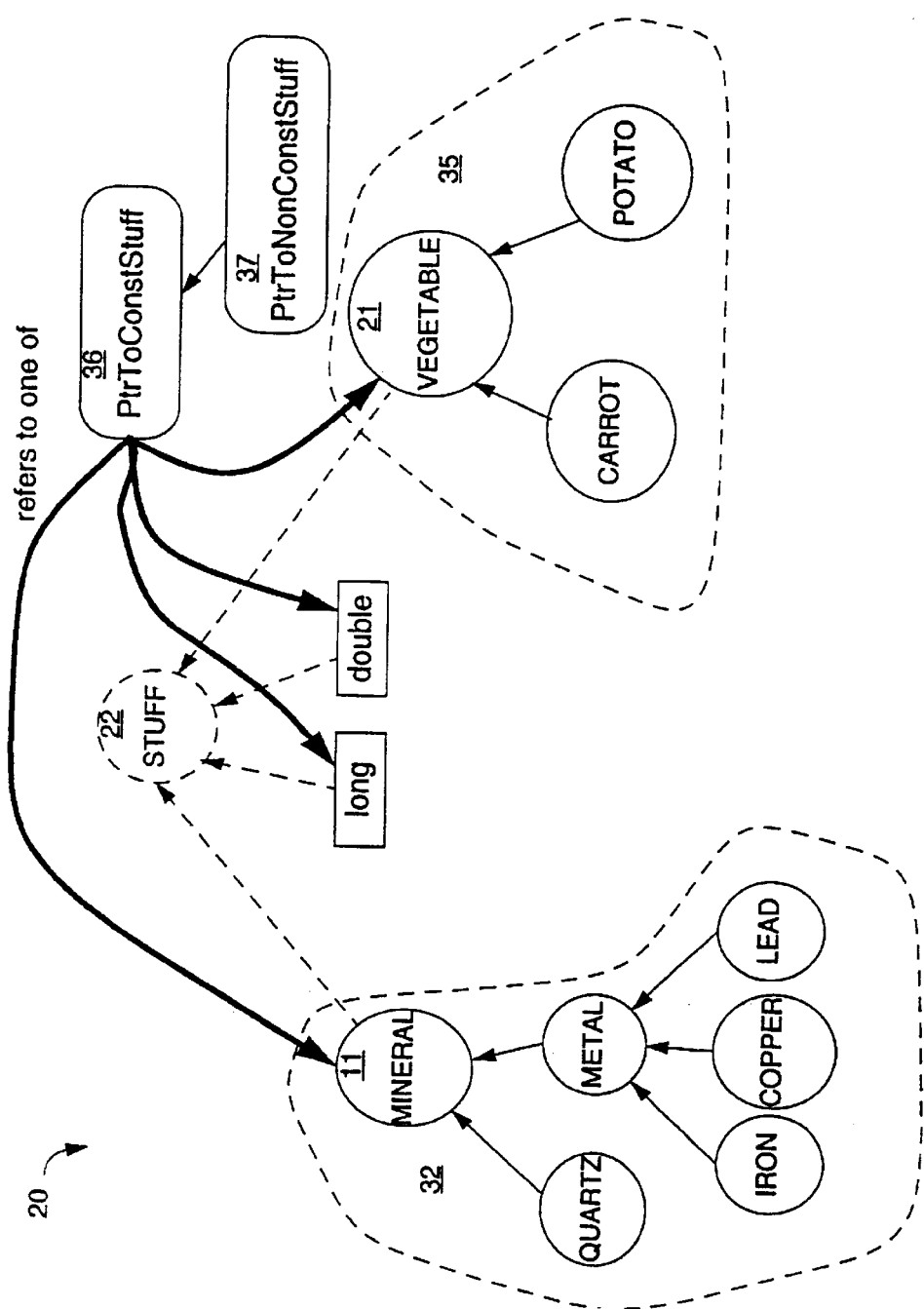
FIG. 3 shows, by way of example, a class diagram 20 of type hierarchies logically joined by a fictitious common base class according to the present invention.

FIG. 3 shows, by way of example, a class diagram 20 of type hierarchies logically joined by a fictitious common base class according to the present invention. Two classes Mineral 11 and Vegetable 21 are defined as the roots of separate, unrelated class hierarchies 32 and 35, respectively. As described above, the present invention allows the two type hierarchies 32 and 35 to be joined through the use of a reference class. However, instances of the base class are not necessary for joining the two type hierarchies. The present invention can be generalized to introduce a fictitious common base class having no instances yet providing an interface, thereby forming a fictitious "superclass" of the joined class hierarchies. From the point of view of an outside function which uses the classes PtrToConstStuff 36 and PtrToNonConstStuff 37, the classes Mineral 11 and Vegetable 21 appear to be "joined" to a fictitious common base class Stuff 22, even though class Stuff 22 need not be specifically defined or declared.

EXAMPLE 6 (shown in the APPENDIX) is a segment of C++ code illustrating a reference class providing the illusions of a fictitious base class joining type hierarchies according to the present invention. This example is structured similar to EXAMPLE 5, but extends the present invention to joining the classes Mineral 11 and Vegetable 21 with the fictitious common base class Stuff 22. If classes PtrToConstStuff 36 and PtrToNonConstStuff 37 are used for referring to the fictitious "common base class," the two class hierarchies will appear to be joined. In practice, class Stuff 22 does not exist but the "joined" class hierarchies are mapped together to function as if class Stuff 22 was a parent class of classes Mineral 11 and Vegetable 21.

Class Vegetable 21 is defined (lines 1–9), including a pair of functions part_of() and rest_of_f() (lines 4–5, respectively) which together provide the same functionality and behavior as function f() of class Mineral (line 14), described below. Additionally, class Vegetable 21 includes a function x_when_called_with_null() (line 6) which maps to a function z() of class Mineral (line 16) to create a consistent signature for function x(). Class Mineral 11 is defined (lines 11–17), including the function z() which behaves as function x() of class Vegetable (line 16) when called with a parameter equalling zero. Classes PtrToConstStuff 36 and PtrToNonConstStuff 37 are defined (lines 19–33 and 35–42, respectively) in the same manner as shown above in EXAMPLE 5. Thus, constructors for const and nonconst instances of classes Mineral 11 and Vegetable 21 (lines 25–26 and 41–42, respectively) and a discriminator consisting of a state variable my_ptr_type and a pointer union ptr for selecting at runtime the appropriate const or nonconst instance of the referred object (lines 29–33) are defined.

As in the previous example, instances of functions f() and x() are defined. Function f() of class PtrToConstStuff 36

(lines 45–60) illustrates the joining of classes Mineral 11 and Vegetable 21 with a fictitious common base class when only one method instance is shared. A switch statement (lines 49–59) using the state variable my_ptr_type discriminates between the class methods f() for classes Vegetable 21 and Mineral 11 (lines 50–54 and 55–59, respectively). Thus, for the shared method instance, function f() of class Mineral 11 is invoked (line 56). Although function f() is not defined in class Vegetable 21, individual functions part_of_f() and rest_of_f() are combined whereby the desired behavior of function f() is achieved for an instance of class Vegetable 21 (lines 51–52).

Function x() of class PtrToNonConstStuff 36 (lines 62–76) illustrates the joining of classes Mineral 11 and Vegetable 21 with a fictitious common base class when no method instance is shared. A switch statement (lines 64–75) using the state variable my_ptr_type discriminates between the functions x_when_called_with_null() for class Vegetable 21 and z() for class Mineral 11 (lines 66–67 and 71–72, respectively). Thus, a function x() for a fictitious class Stuff 22 is invoked, even though neither class Vegetable 21 nor Mineral 11 define a function x().

The present approach effectively simulates a fictitious class Stuff 22 to act as a common base class to classes Mineral 11 and Vegetable 21 without modification to the definitions of either class. The present invention allows instances of both classes to be treated as if derived from a common base class even though no such class in fact exists. Such an approach is useful for logically merging existing class hierarchies into a new hierarchy. For instance, classes TextObject, Line and Shape could all be "merged" into a fictitious base class Graphical.

EXAMPLE 7 (shown in the APPENDIX) is a segment of C++ code illustrating a reference class providing the illusion of a fictitious class joining type hierarchies which include built-in data types according to the present invention. The present approach allows built-in and user defined data types to be treated in similar fashion by forming a common base class. The distinctions between built-in versus user defined data types is encapsulated in the reference class.

In the present example, a reference class PtrToConstTextString (lines 8–27) is defined for storing pointers to objects of any of three types: (1) instances of class TextString (line 11), a derived data type of class TextString (lines 1–6); (2) null terminated character strings (lines 12–13); and (3) unsigned integers (lines 14–15). Similar to the preceding example, a discriminator consisting of a state variable and pointer union for selecting at runtime the appropriate object (lines 21–26) is defined.

Function length() of class PtrToConstTextString (lines 29–39) illustrates the joining of the built-in and user defined data types. A switch statement (lines 31–38) using the state variable pd_state discriminates between functions for each of the data types. Thus, for the user defined data type, function length() is invoked on the instance of TextString (lines 32–33). Similarly, for the built-in data types, functions strlen() and log10() are invoked for the character string and unsigned integer (lines 34–35 and 36–37, respectively).

EXAMPLE 8 (shown in the APPENDIX) is a segment of C++ code illustrating the use of reference classes for polymorphism when joining type hierarchies which include built-in data types, such as chars, floats, longs and others, and user defined data types, such as structs, unions, classes and the like. The reference classes enable a single function template to present a polymorphic signature over primitive and user defined data types for both parameter arguments and return values.

In the present example, two reference classes RefToConstStuff (lines 1–31) and RefToNonConstStuff (lines 33–49) are defined with constructors for storing pointers to various built-in and derived data types (lines 3–12 and 35–44, respectively). Similar to the preceding example, a pair of discriminators for each of the reference classes consisting of a state variable and pointer union for selecting at runtime the appropriate object (lines 15–30) is defined. The conversion operators to types float, Mineral and Vegetable are defined (lines 46–48). These conversion functions must check the value of the state variable and raise an exception if the object referred to cannot be converted to the requested type. Finally, instances m, f and v of data types float, Mineral and Vegetable, respectively, are assigned values (lines 51–53).

Function store() (line 55) can be declared taking as an argument an instance of class RefToConstStuff. Thus, when invoked, the function store() can accept, without requiring an explicit cast, an input parameter of any type for which RefToConstStuff has a defined constructor, including float, Mineral and Vegetable (lines 58–60).

Similarly, function retrieve() (line 62) can be defined as a function of type RefToNonConstStuff. The conversion operations in the definition of class RefToNonConstStuff enable an implicit conversion of the return value from type RefToNonConstStuff to types float and Mineral.

The present approach enables built-in and user defined data types to appear as being derived from a common base class. Moreover, the interface to the base class avoids the need for separate function implementations for each supported built-in data type. Code duplication is thereby avoided. The present approach further enables compile time const'ness checking for programming languages that do not discriminate with respect to const'ness. Finally, although the present invention is described in the context of an object oriented programming language, it is equally applicable to objected oriented computer programs written in non-object oriented programming languages, such as the X window system which is written in the C programming language.

Having described and illustrated the principles of the invention in a preferred embodiment thereof, it should be apparent that the invention can be modified in arrangement and detail without departing from such principles. We claim all modifications and variations coming within the spirit and scope of the following claims.

EXAMPLE 1 (PRIOR ART)

```
1    class Thing
2    {
3        virtual void f()  const;
4        virtual void g()  const;
```

-continued

```
5          virtual void g();           // Overload function g() as nonconst
6          virtual void x();
7       };
8
9          Thing nonconst_a;           // Nonconst instance of Thing
10  const  Thing const_a;              // Const instance of Thing
11
12  const  Thing&tr1 = nonconst_a;     // Valid init of const ref to nonconst obj
13  const  Thing&tr2 = const_a;        // Valid init of const ref to const obj
14         Thing&tr3 = nonconst_a;     // Valid init of nonconst ref to nonconst
15                                     // obj
16         Thing&tr4 = const_a;        // Invalid init of nonconst ref to const
17                                     // obj
18
19         nonconst_a.f();             // Valid function call
20         nonconst_a.g();             // Valid function call invokes second
21                                     // of two overloaded g() functions
22         nonconst_a.x();             // Valid function call
23         const_a.f();                // Valid function call
24         const_a.g();                // Valid function call invokes first
25                                     // of two overloaded g() functions
26         const_a.x();                // Invalid and compiler error since
27                                     // nonconst function x() called
28                                     // with const reference
```

EXAMPLE 2

```
1   classRefThing              // Define pointer class
2   {
3   protected:
4       const Thing* ptr;
5
6   public:
7       void f()   const;      // These functions are declared const
8       void g()   const;      // (non-changing) since RefThing objs
9       void x()   const;      // are const regardless of referred obj
10
11      bool const_p;
12
13      RefThing(Thing* t)     // Nonconst constructor
14      {
15         ptr = t;
16         const_p = false;
17      }
18
19      RefThing(const Thing* t)  // Const constructor
20      {
21         ptr = t;
22         const_p = true;
23      }
24   };
25
26   void RefThing::g() const
27   {
28       if (const_p)
29          ptr—>g();
30       else {
31          Thing*tmp = (Thing*)ptr;
32          tmp—>g();
33       }
34   }
35
36   void RefThing::x() const
37   {
38       if (const_p)
39          throw Const'nessViolation ();
40       else {
41          Thing*tmp = (Thing*)ptr;
42          tmp—>x();
43       }
44   }
```

EXAMPLE 3

```
1   classPtrToConstThing        // No x() method
2   {
3       void f() const;
4       void g() const;
5
6   protected:
7       const Thing* ptr;
```

-continued

```
8
9        PtrToConstThing(const Thing* t)    // Const constructor
10       {
11           ptr = t;
12       }
13
14  };
15
16  classPtrToNonConstThing: public PtrToConstThing
17  {
18       void g() const;
19       void x() const;
20
21       PtrToNonConstThing(Thing* t): PtrToConstThing(t) {}
22  };
23
24  RefThing                tr;
25  PtrToNonConstThing      nonconst_c;
26  PtrToConstThing         const_c;
27
28  tr.x();                 // Known only at runtime if valid as to const'ness
29  nonconst_c.x();         // Known to be valid at compile time
30  const_c.x();            // Compiler error since no x() method in
31                          // PtrToConstThing class
32
33  const_c = nonconst_c;   // Valid assignment
34  nonconst_c = const_c;   // Invalid assignment and compiler error since
35                          // improperly relaxing restrictions on const obj
36
37  void PtrToConstThing::g() const
38  {
39       ptr—>g();
40  }
41
42  void PtrToNonConstThing::g() const
43  {
44       Thing*tmp = (Thing*)ptr;
45       ptr—>g();
46  }
```

EXAMPLE 4

```
1        class Mineral
2        {
3            void f( )      const;
4            void g( )      const;
5            void z(int);
6        };
```

EXAMPLE 5

```
1   classPtrToConstThing
2   {
3        void f() const;
4        void g() const;
5                                               // AnyConstRef
6        PtrToConstThing(const Thing*);         // Const Thing constructor
7        PtrToConstThing(const Mineral*);       // Const Mineral constructor
8
9        protected:
10           enum states {I_Am_Thing, I_Am_Mineral} my_ptr_type;
11           union {
12               const Thing *tp;
13               const Mineral *mp;
14           } ptr;
15
16  };
17
18  classPtrToNonConstThing: public PtrToConstThing     // Derived class
19  {
20       void g() const;
```

-continued

```
21      void x() const;
22                                      // AnyRef
23      PtrToNonConstThing(Thing*);     // Nonconst Thing constructor
24      PtrToNonConstThing(Mineral*);   // Nonconst Mineral constructor
25  };
26
27  void PtrToConstThing::f() const     // Function f() declared in
28                                      // PtrToConstThing, Thing and
29                                      // Mineral classes
30  {
31      switch (my_ptr_type) {
32          case I_Am_Thing: {          // Discriminate between
33              ptr.tp—>f()             // class methods f() of
34              return;                 // Thing::f() and
35          }                           // Mineral::f() classes
36          case I_Am_Mineral: {
37              ptr.mp—>f();
38              return;
39          }
40      }
41  }
42
43  void PtrToNonConstThing::x() const
44  {
45      switch (my_ptr_type) {
46          case I_Am_Thing: {
47              Thing*tmp = (Thing*)ptr.tp;
48              tmp—>x();
49              return;
50          }
51          case I_Am_Mineral: {        // Adapt two class
52              Mineral*tmp = (Mineral*)ptr.mp;  // hierarchies to
53              tmp—>z(0);              // provide functionality
54              return;                 // of Thing::x() in
55          }                           // terms of Mineral::z()
56      }
57  };
```

EXAMPLE 6

```
1   class Vegetable
2   {
3   public:
4       void part_of_f() const;         // Two methods which, taken together, give
5       void rest_of_f(int) const;      // desired behavior for f()
6       void x_when_called_with_null(char *);
7       void g() const;
8       void g(Context *);
9   };
10
11  class Mineral
12  {
13  public:
14      void f()   const;
15      void g()   const;
16      void z(int);                    // Acts like x() when called with 0
17  };
18
19  class PtrToConstStuff
20  {
21  public:
22      void f()   const;
23      void g()   const;
24                                      // AnyConstRef
25      PtrToConstStuff(const Vegetable*);  // Const Vegetable constructor
26      PtrToConstStuff(const Mineral*);    // Const Mineral constructor
27
28  protected:
29      enum states {I_Am_Vegetable, I_Am_Mineral} my_ptr_type;
30      union {
31          const Vegetable *vp;
32          const Mineral *mp;
33      } ptr;
```

-continued

```
34   };
35
36   class PtrToNonConstStuff: public PtrToConstStuff    // Derived class
37   {
38       void g()  const;
39       void x()  const;
40                                                       // AnyRef
41       PtrToNonConstStuff(Vegetable*);                 // Nonconst Vegetable constructor
42       PtrToNonConstStuff(Mineral*);                   // Nonconst Mineral constructor
43   };
44
45   void PtrToConstStuff::f() const                     // Function f() declared in
46                                                       // PtrToConstStuff and Mineral
47                                                       // classes
48   {
49       switch (my_ptr_type) {
50           case I_Am_Vegetable: {
51               ptr.vp—>part_of_f();
52               ptr.vp—>rest_of_f();
53               return;
54           }
55           case I_Am_Mineral: {
56               ptr.mp—>f();
57               return;
58           }
59       }
60   }
61
62   void PtrToNonConstStuff::x() const
63   {
64       switch (my_ptr_type) {
65           case I_Am_Vegetable: {
66               Vegetable *tmp = (Vegetable*)ptr.vp;
67               tmp—>x_when_called_with_null(NULL);
68               return;
69           }
70           case I_Am_Mineral: {
71               Mineral*tmp = (Mineral*)ptr.mp;
72               tmp—>z(0);
73               return;
74           }
75       }
76   }
```

EXAMPLE 7

```
1    class TextString
2    {
3    public:
4        virtual void       print(ostream &)      const = 0;
5        virtual unsigned   length()              const = 0;
6    };
7
8    class PtrToConstTextString
9    {
10   public:
11       PtrToConstTextString(const TextString *);
12       PtrToConstTextString(const char *);             // Pointer to a null
13                                                       // terminated string
14       PtrToConstTextString(const unsigned *);         // Considers number as a
15                                                       // string
16
17       void       print(ostream &)    const;
18       unsigned   length()            const;
19
20   protected:
21       enum State {Is_TextString, Is_CharArray, Is_Unsigned} pd_state;
22       union {
23           const TextString *tsp;
24           const char *s;
25           const unsigned *u;
26       } pd_val;
27   };
```

```
28
29  unsigned PtrToConstTextString::length() const
30  {
31      switch (pd_state) {
32          case Is_TextString:
33              return pd_val.tsp—>length();
34          case Is_CharArray:
35              return strlen(pd_val.s);
36          case Is_Unsigned:
37              return log10(*pd_val.u);
38      }
39  }
```

```
1   class RefToConstStuff {
2       public:
3           RefToConstStuff(const char &);              // Constructors take
4           RefToConstStuff(const unsigned char &);     // pointers instead
5           RefToConstStuff(const short &);             // of references
6           RefToConstStuff(const unsigned short &);
7           RefToConstStuff(const long &);
8           RefToConstStuff(const unsigned long &);
9           RefToConstStuff(const float &);
10          RefToConstStuff(const double &);
11          RefToConstStuff(const Mineral &);
12          RefToConstStuff(const Vegetable &);
13
14      protected:
15          enum State {AsChar, AsUChar, AsShort, AsUShort,
16                  AsLong, AsULong, AsFloat, AsDouble,
17                  AsMineral, AsVegetable} pd_state;
18
19          union {
20              const char * c;
21              const unsigned char * uc;
22              const short * s;
23              const unsigned short * us;
24              const long * l;
25              const unsigned long * ul;
26              const float * f;
27              const double * d;
28              const Mineral * m;
29              const Vegetable * v;
30          } pd_val;
31  };
32
33  class RefToNonConstStuff : public RefToConstStuff {
34      public:
35          RefToNonConstStuff(char &);
36          RefToNonConstStuff(unsigned char &);
37          RefToNonConstStuff(short &);
38          RefToNonConstStuff(unsigned short &);
39          RefToNonConstStuff(long &);
40          RefToNonConstStuff(unsigned long &);
41          RefToNonConstStuff(float &);
42          RefToNonConstStuff(double &);
43          RefToNonConstStuff(Mineral &);
44          RefToNonConstStuff(Vegetable &);
45
46          operator float() const;
47          operator Mineral&() const;
48          operator Vegetable&() const;
49  };
50
51  float f = 1.23;      // Instance of built-in type float
52  Mineral m;           // Instance of derived type Mineral
53  Vegetable v;         // Instance of derived type Vegetable
54
55  void store(RefToConstStuff);    // Function with a polymorphic
56                                  // parameter list
57
58  store(f);
59  store(m);
60  store(v);
61
```

```
-continued

62  RefToNonConstStuff retrieve();      // Function with polymorphic
63                                       // return value
64
65  f = retrieve();
66  m = retrieve();
```

What is claimed is:

1. A system for creating a pretense of joining a plurality of type hierarchies in a single hierarchy, the system comprising a computer including a processor, a memory and input/output facilities, each type in each type hierarchy having a template describing objects that are instances of the type, comprising:

at least one reference class to refer to the type hierarchies as if the referred type hierarchies were inherited from a common base class such that separate and unrelated ones of the type hierarchies can be joined together without modifying the type hierarchies, wherein the referred type hierarchies are not physically modified to refer to the common base class wherein the reference class further includes a discriminator which can refer to instances of at least one such type within one of the type hierarchies, wherein the discriminator discriminates between the type hierarchies; and for each type hierarchy, an initialization function which takes as an argument a reference to an instance of any of the types in the type hierarchy, wherein the initialization function is performed by loading the discriminator with the argument; and the initialization function is performed by loading the discriminator with the argument; and the processor being operative to read the reference class and responsive to the initialization function included for each type hierarchy to load the discriminator with the argument of the initialization function.

2. A system according to claim 1, wherein the discriminator comprises a state indicia and a reference indicia, the processor further comprising:

means for setting the state indicia to uniquely identify the type hierarchy of the instance referred to by the discriminator; and means for loading the reference indicia with an address for the instance of the corresponding uniquely identified type hierarchy.

3. A system according to claim 2, wherein the state indicia is an enumerated data type including one value corresponding to each type hierarchy and the reference indicia is a pointer union including one pointer corresponding to each type hierarchy.

4. A system according to claim 1, the processor further comprising means for restricting the initialization functions of one such reference class to accepting references to objects that are to be treated as constant.

5. A system according to claim 4, the processor further comprising:

means for defining the initialization functions of a further such reference class accepting references to instances of substantially each such type within the type hierarchies of the one such reference class; and means for providing a conversion function to the one such reference class from the further such reference class.

6. A system according to claim 1, the processor further comprising means for defining the reference class to present functions of an interface of a base class of one of the type hierarchies.

7. A system according to claim 1, the processor further comprising means for defining the reference class to present functions of an interface of a fictitious class.

8. A system according to claim 1, wherein at least one of the type hierarchies includes a built-in data type.

9. A method of using a computer for creating a pretense of joining a plurality of type hierarchies in a single hierarchy, each type in each type hierarchy comprising a template describing objects that are instances of the type, comprising the steps of:

defining at least one reference class to refer to the type hierarchies as if the referred type hierarchies were inherited from a common base class in a single hierarchy such that separate and unrelated ones of the type hierarchies can be joined together without modifying the type hierarchies, wherein the referred type hierarchies are not physically modified to refer to the common base class wherein the reference class further includes a discriminator which can refer to instances of at least one such type within one of the type hierarchies, wherein the discriminator discriminates between the type hierarchies, for each type hierarchy, an initialization function which takes as an argument a reference to an instance of any of the types in the type hierarchy, wherein the initialization function is performed by loading the discriminator with the argument; and performing the initialization function included for each type hierarchy by loading the discriminator with the argument of the initialization function.

10. A method according to claim 9, further comprising the step of implementing at least one function of the at least one reference class through use of the instance of the type hierarchy referred to by one such discriminator.

11. A method according to claim 10, wherein the use of the instance of the type hierarchy comprises the step of invoking a function having a same name as the function being implemented.

12. A method according to claim 9, wherein at least one of the initialization functions is a constructor function.

13. A method according to claim 9, wherein at least one of the initialization functions is an assignment operation.

14. A method according to claim 9, wherein the discriminator comprises a state indicia and a reference indicia, the method further comprising the steps of:

setting the state indicia to uniquely identify the type hierarchy of the instance referred to by the discriminator; and loading the reference indicia with an address for the instance of the corresponding uniquely identified type hierarchy.

15. A method according to claim 14, wherein the state indicia is an enumerated data type including one value corresponding to each type hierarchy and the reference indicia is a pointer union including one pointer corresponding to each type hierarchy, the step of setting the state indicia further comprising the step of selecting the value of the enumerated data type corresponding to the type hierarchy and the step of loading the reference indicia further comprising the step of setting the corresponding pointer of the pointer union to the address for the type hierarchy instance.

16. A method according to claim 9, further comprising the step of restricting the initialization functions of one such reference class to accepting references to objects that are to be treated as constant.

17. A method according to claim 16, further comprising the steps of:
defining the initialization functions of a further such reference class accepting references to instances of substantially each such type within the type hierarchies of the one such reference class; and
providing a conversion function to the one such reference class from the further such reference class.

18. A method according to claim 17, further comprising the steps of:
defining the one such reference class to present functions of an identified interface of a base class of one of the type hierarchies, the functions being declared as restricted to such functions appropriate to constant instances; and
defining the one such further reference class to present functions of the identified interface of the base class, the functions being declared as restricted to such functions appropriate to nonconstant instances.

19. A method according to claim 17, further comprising the steps of:
defining the one such reference class to present functions of an interface of a fictitious class, the functions being declared as restricted to such functions appropriate to constant instances; and
defining the one such further reference class to present functions of an interface of the fictitious class, the functions being declared as restricted to such functions appropriate to nonconstant instances.

20. A method according to claim 17, further comprising the step of deriving the further such reference class from the one such reference class.

21. A method according to claim 16, further comprising the step of implementing at least one function of the reference class through use of the instance of the type hierarchy referred to by one such discriminator, the use of the instance being restricted to operations appropriate to objects that are to be treated as constant.

22. A method according to claim 9, further comprising the step of defining the reference class to present functions of an interface of a base class of one of the type hierarchies.

23. A method according to claim 9, further comprising the step of defining the reference class to present functions of an interface of a fictitious class.

24. A method according to claim 9, wherein at least one of the type hierarchies includes a built-in data type.

25. A computer-readable storage medium for encoding program code for creating a pretense of joining a plurality of type hierarchies in a single hierarchy, each type in each type hierarchy comprising a template describing objects that are instances of the type, comprising:
instructions that define at least one reference class to refer to the type hierarchies as if the referred type hierarchies were inherited from a common base class in a single hierarchy such that separate and unrelated ones of the type hierarchies can be joined together without modifying the type hierarchies, wherein the referred type hierarchies are not physically modified to refer to the common base class wherein the reference class further includes
a discriminator which can refer to instances of at least one such type within one of the type hierarchies, wherein the discriminator discriminates between the type hierarchies,
for each type hierarchy, an initialization function which takes as an argument a reference to an instance of any of the types in the type hierarchy, wherein the initialization function is performed by loading the discriminator with the argument; and
instructions that perform the initialization function included for each type hierarchy by loading the discriminator with the argument of the initialization function.

26. A storage medium according to claim 25, further comprising instructions for implementing at least one function of the at least one reference class through use of the instance of the type hierarchy referred to by one such discriminator.

27. A storage medium according to claim 25, wherein the discriminator comprises a state indicia and a reference indicia, the storage medium further comprising:
instructions for setting the state indicia to uniquely identify the type hierarchy of the instance referred to by the discriminator; and
instructions for loading the reference indicia with an address for the instance of the corresponding uniquely identified type hierarchy.

28. A storage medium according to claim 25, further comprising instructions for restricting the initialization functions of one such reference class to accepting references to objects that are to be treated as constant.

29. A storage medium according to claim 28, further comprising:
instructions for defining the initialization functions of a further such reference class accepting references to instances of substantially each such type within the type hierarchies of the one such reference class; and
instructions for providing a conversion function to the one such reference class from the further such reference class.

30. A storage medium according to claim 29, further comprising:
instructions for defining the one such reference class to present functions of an identified interface of a base class of one of the type hierarchies, the functions being declared as restricted to such functions appropriate to constant instances; and
instructions for defining the one such further reference class to present functions of the identified interface of the base class, the functions being declared as restricted to such functions appropriate to nonconstant instances.

31. A storage medium according to claim 29, further comprising:
instructions for defining the one such reference class to present functions of an interface of a fictitious class, the functions being declared as restricted to such functions appropriate to constant instances; and
instructions for defining the one such further reference class to present functions of an interface of the fictitious class, the functions being declared as restricted to such functions appropriate to nonconstant instances.

* * * * *